United States Patent
Conwell et al.

(10) Patent No.: US 7,095,324 B2
(45) Date of Patent: Aug. 22, 2006

(54) TAMPER EVIDENT SMART LABEL WITH RF TRANSPONDER

(75) Inventors: Kevin Girard Conwell, Fairfield, OH (US); Matt Adams, Cincinnati, OH (US)

(73) Assignee: Intermec IP Corp, Everett, WA (US)

( * ) Notice: Subject to any disclaimer, the term of this patent is extended or adjusted under 35 U.S.C. 154(b) by 147 days.

(21) Appl. No.: 10/092,174

(22) Filed: Mar. 6, 2002

(65) Prior Publication Data

US 2002/0135481 A1    Sep. 26, 2002

Related U.S. Application Data

(60) Provisional application No. 60/273,800, filed on Mar. 6, 2001.

(51) Int. Cl.
*G08B 13/14* (2006.01)

(52) U.S. Cl. .................. 340/572.1; 340/572.3; 235/488

(58) Field of Classification Search .. 340/572.1–572.8; 235/488, 489, 494, 487
See application file for complete search history.

(56) References Cited

U.S. PATENT DOCUMENTS

| | | | | |
|---|---|---|---|---|
| 4,099,838 | A * | 7/1978 | Cook et al. .................. 359/537 |
| 4,300,297 | A * | 11/1981 | Betterley ..................... 40/662 |
| 4,746,556 | A * | 5/1988 | Matsuguchi et al. ........ 428/41.1 |
| 5,018,286 | A * | 5/1991 | Zahner ........................ 40/665 |
| 5,061,535 | A * | 10/1991 | Kreckel et al. ............. 428/42.2 |
| 5,405,197 | A * | 4/1995 | Makowka ..................... 383/5 |
| 5,464,690 | A * | 11/1995 | Boswell ....................... 428/334 |
| 5,477,219 | A * | 12/1995 | Zarembo et al. ........... 340/572.3 |
| 5,560,657 | A * | 10/1996 | Morgan ....................... 283/80 |
| 5,629,093 | A * | 5/1997 | Bischof et al. ............. 428/411.1 |
| 5,660,925 | A * | 8/1997 | Cooley et al. .............. 428/304.4 |
| 5,683,774 | A * | 11/1997 | Faykish et al. ............. 428/40.1 |
| 5,850,181 | A | 12/1998 | Heinrich et al. |
| 5,884,425 | A * | 3/1999 | Baldwin ....................... 40/638 |
| 5,900,307 | A * | 5/1999 | Barcikowski ............... 428/203 |
| 5,920,290 | A * | 7/1999 | McDonough et al. ........ 343/873 |
| 5,981,166 | A * | 11/1999 | Mandecki ...................... 435/4 |
| 6,002,344 | A * | 12/1999 | Bandy et al. ............... 340/10.2 |
| 6,050,622 | A * | 4/2000 | Gustafson .................. 292/307 R |
| 6,255,948 | B1 * | 7/2001 | Wolpert et al. ........... 340/572.8 |
| 6,419,391 | B1 * | 7/2002 | Thomas ........................ 383/5 |
| 6,462,765 | B1 * | 10/2002 | Conwell et al. ............. 347/171 |
| 6,572,022 | B1 * | 6/2003 | Suzuki ........................ 235/492 |
| 6,582,791 | B1 * | 6/2003 | Peloquin et al. ........... 428/41.5 |

OTHER PUBLICATIONS

3M Tmaper evident computer imageable polyester label stock 7866.*
3M ScotchMark 7610 Destructible white vinyl film.*
3M Product Specification for 7610 Destructible White Vinyl Film Roll and 7900 Destructible White Vinyl Film Street.
3M Product Specification for 7866 Tamper-Indicating Label Material for Thermal Transfer Printing.

(Continued)

*Primary Examiner*—Phung T. Nguyen
(74) *Attorney, Agent, or Firm*—Orum & Roth LLC

(57) ABSTRACT

A tamper evident smart label with an RFID or RF transponder. Use of tamper evident label materials in the layered construction of the smart label prevents removal, transferal, replacement and or alteration of the smart label without noticeable evidence of tampering. Propagation cuts in the RF Transponder substrate, adhesive that separates into visible patterns, holograms and or microprinting may be used to increase label tampering visibility.

15 Claims, 2 Drawing Sheets

OTHER PUBLICATIONS

3M Product Specification for 7385 Tamper-Indicating Label Material for Dot-Matrix Impact Printing.
3M Product Specification for 7847 Laser Markable Label Material.
3M Product Specification for Destructible Vinyl Label Material.
Tag-it—The New World of Smart Labels, Texas Instruments TIRIS News, Issue No. 19, pp. 1 and 3, 1999.
Pilot Testing of Tag-it Parcel Shipping Company Shows Excellent Results, Texas Instruments TIRIS News, Issue No. 19, p. 3, 1999.
TI Announces Two New Tag-it Products, Texas Instruments TIRIS News, Issue No. 20, p 7, 2000.

* cited by examiner

TAMPER EVIDENT SMART LABEL WITH RF TRANSPONDER

This application claims the benefit of U.S. Provisional Application No. 60/273,800 filed Mar. 6, 2001.

BACKGROUND OF THE INVENTION

1. Field of the Invention

The invention relates to "smart labels" or RFID tags, specifically RFID tags with a tamper evident or tamper indicating feature.

2. Description of the Related Art

Prior smart labels in the Automatic Identification Industry do not display evidence of tampering when removed or peeled away from a substrate. Most common paper or film labels with a pressure sensitive adhesive can easily be peeled up from a surface without tearing or damaging the label stock. Therefore, there is a need for a label that is made from a tamper-indicating material that would prevent access to the embedded RFID transponder without noticeable damage to the label stock. This security feature would prevent the RFID transponder from being removed, altered, replaced, or transferred to another label or substrate.

Radio frequency transponders (also known as "RFID tags") generally include an antenna and integrated memory circuit with read/write capability used to store digital information, such as an electrically erasable programmable read only memory (EEPROM) or similar electronic device. Active RFID tags include their own radio transceiver and power source (battery) and are generally sealed within a molded plastic housing or "button". Passive RFID tags are energized to transmit and receive data by an electromagnetic field and do not include a radio transceiver or power source. As a result, they are small and inexpensive with limited range, resolution, and data storage capacity. Some common passive RFID tags include the Intermec Intellitag 500 ™ and Texas Instruments' TagIt ™. Passive RFID tags used in the Automatic Identification Industry are typically laminated or inserted into a paper or synthetic label stock backed with pressure sensitive adhesive for applying the printed label to a carton, automobile, pallet, airline baggage, parcel, or other article to be tracked. These labels are commonly referred to as "smart labels".

SUMMARY OF THE INVENTION

A tamper evident smart label with an RFID or RF transponder. Use of tamper evident label materials in the layered construction of the smart label prevents removal, transferal, replacement and or alteration of the smart label without noticeable evidence of tampering.

DETAILED DESCRIPTION

A smart label made from tamper evident or tamper-indicating material designed to prevent access to the embedded RFID or RF transponder without noticeable visible damage to the label. This unique security feature deters the removal, alteration, replacement, or transference of the embedded RF transponder. This design is applicable for automotive compliance labeling, airline baggage, parcels, or any other article that requires tracking with a tamper evident smart label.

Tamper evident label materials are engineered to self-destruct when removed from a substrate. The primary function of these products is to produce a tamper-indicating label or seal by causing the label to fracture when removal from a substrate is attempted. There are a variety of different tamper evident or tamper-indicating label materials available from 3M Company, St. Paul, Minn., including 7610 ScotchMark Destructible White Vinyl. The 7610 product uses a fragile cast vinyl face with very low tensile and tear resistance designed to crack and break when peeled off of a surface because the permanent adhesive bond is stronger than the label face. Other types of tamper-indicating labels utilize a "void" pattern in the adhesive as with 3M 7866 Polyester. This product uses a clear polyester face stock with a white pigmented adhesive. A silicone type pattern is printed on back of the label face such that as the label is peeled from a surface only part of the adhesive removes with the label. The adhesive pattern is such that it creates a "VOID" word pattern across the label face stock. Applications for destructible tamper evident labels include safety warning labels, warranty seals, packaging seals, license labels, calibration seals, and asset labels.

Figure 1:
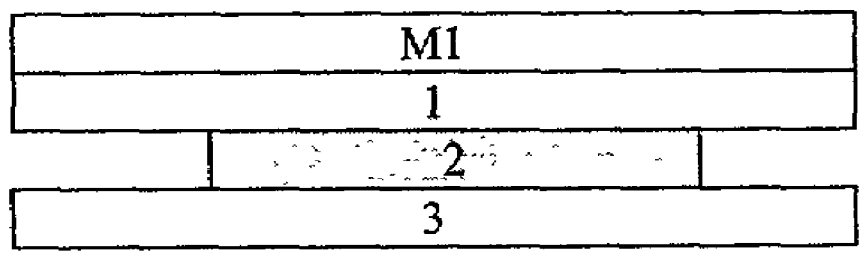
FIG. 1 is a side view of one embodiment of a smart label according to the invention.

As shown in FIG. 1, one embodiment of the invention uses a label or tag material M1 made from a self-destructible material such as the 3M 7900, 7930 or 7610 ScotchMark Destructible White Vinyl or similar tamper-indicating materials designed to fracture or break apart when peeled up from a substrate 3. This label stock is imprintable on demand with thermal transfer ribbon ink, or it can be preprinted on a press using flexographic, letterpress, offset, rotogravure, screen, or other technology. This label with adhesive 1 and release liner contains an embedded passive RFID transponder tag inserted such that it is sandwiched between the adhesive and the release liner. After printing, the label is removed from the release liner, which protects the label during printing and before application; the RF transponder remains attached to the adhesive 1 and is applied with the label to a substrate 3.

One application where this type of label is useful is in automotive compliance labeling. It is preferred by automotive manufacturers that the vehicle identification number (VIN) label and Federal Certification/Tire Pressure label located on the door jam of an automobile be tamper evident. This VIN label, in a smart label form according to the invention, includes an embedded RF transponder, an emerging technology preferred by the automotive industry.

Figure 2:
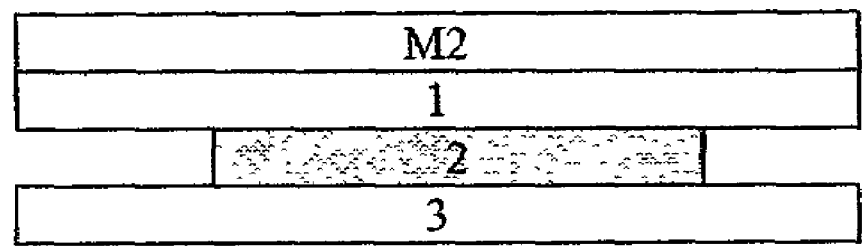
FIG. 2 is a side view of another embodiment of a smart label according to the invention.

A second embodiment, shown in FIG. 2, for a tamper evident smart label uses "3M 7847 Laser Markable Tamper Evident Label Material" or similar material M2 with an embedded RF transponder 2. This is a specialty film that can be imaged and "kiss cut" by a laser beam. The top layer is engineered to be ablated by a laser beam to create an image (top face layer is a black acrylate, bottom face layer is a white acrylate). This engraved inscription provides long-term readability and abrasion resistance for applications such as VIN labels or Federal Certification/Tire Pressure labels on automobiles. The destructible facestock material provides tamper evidence to meet security labeling requirements.

Figure 3:
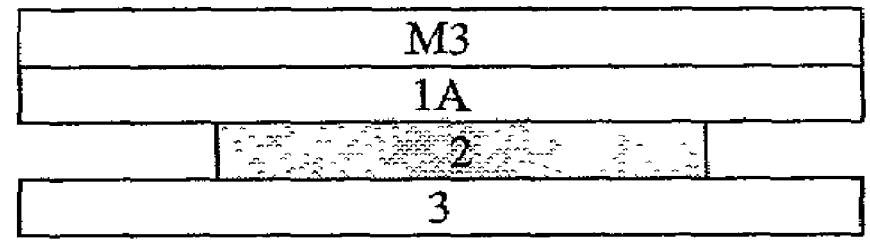
FIG. 3 is a side view of another embodiment of a smart label according to the invention.

A third embodiment for providing tamper evidence is to incorporate a "void" adhesive pattern into the label product, as shown in FIG. 3. Materials M3 such as 3M 7866 Gloss White Polyester, 7389 Silver Polyester, and 7385 Tamper-Indicating Label Material for Dot Matrix Impact Printing are designed to provide a "void" or other message in the face stock when removal is attempted. The primary function of these label products is to create a non-transferable (non-reusable) label or seal by causing the "VOID" destruct message to appear in the label face when removed from a substrate 3. These label materials are manufactured by 3M using a clear polyester face stock with a pigmented adhesive 1A. A silicone type "void" pattern is printed on back of the label face so that as the label is peeled from a surface only part of the adhesive 1A removes with the label. The adhesive 1A pattern is such that it creates a repeating pattern of the word "VOID" across the label face. The remaining adhesive 1A on the substrate 3 also displays the same "VOID" pattern. Any desired pattern, symbol or phrase may be applied in place of "VOID".

Figure 4:
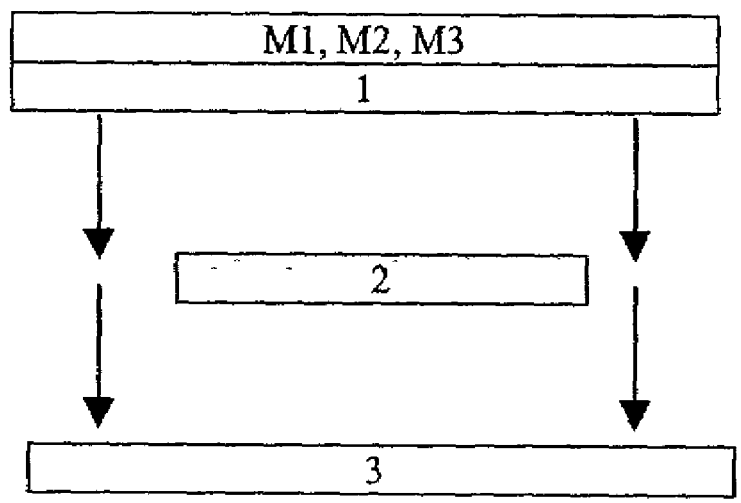
FIG. 4 is a side view of a smart label indicating the order of assembly.

Note, any of the tamper evident labels described above could be applied to a substrate 3 independently of the RF transponder 2 (the RF transponder does not have to be embedded within the label). This can be accomplished simply by holding the RF transponder 2 against the substrate 3 or adhesive 1, then applying any label made of a tamper evident material over the RF transponder as indicated in FIG. 4.

Figure 5:
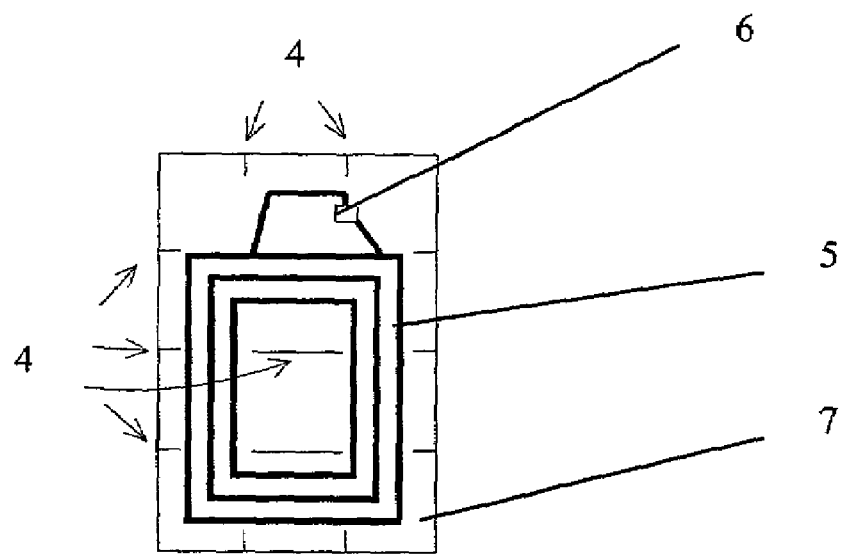
FIG. 5 is a front view of RF Transponder embodiment for use in a tamper evident smart label showing sample locations for propagation cuts in the RFID transponder substrate.

In another embodiment, in addition to using the tamper evident label materials to prevent an RF transponder 2 from being removed, altered, replaced, or transferred to another label or substrate, the RF transponder 2 itself may be formed in a tamper evident manner. Passive RF transponders 2 are typically manufactured using a polyester or polyamide base film 7 designed to accept the printed antenna 5 and mounted integrated circuit chip 6. A tamper-evident transponder is manufactured by using a tamper evident material as the transponder base film 7. Also, the RFID transponder substrate can be processed to include propagation tear cuts 4 around the perimeter of the antenna base film. When the attempt is made to remove the RF transponder 2 from either the label or a surface the label is attached to, these propagation cuts 4 will use the tensile strain created within the RF transponder 2 through the removal process to sever the transponder into one or more pieces, thus destroying the antenna 5 and thereby the functionality of the RF transponder 2. One example of possible propagation cuts 4 is shown in FIG. 5.

An additional mechanism that could be added as an indicator of tampering would be to apply a covert technology such as holograms or microprinting for authenticity on any of these smart label designs. This would provide a secondary security measure to make it difficult to change or duplicate a smart label. Note also that these designs should not be limited to just RFID transponders. Any of these tamper-evident designs may also be applied to smart labels containing standard EAS devices (single bit electronic article surveillance devices). There may also be situations where the RF transponder or EAS device could be applied to the surface of a label instead of embedded in or under the label. This design may be necessary to readily identify if the RF transponder or EAS device is still present and has not been removed, altered, or tampered with in any manner.

This invention(s) is entitled to a range of equivalents and is to be limited only by the range of the claims, below.

REFERENCE

The following references are hereby incorporated by reference in their entirety.

Patents:
U.S. Pat. No. 05850181 "Method of Transporting Radio Frequency Power to Energize RFID Transponders".

Related Publications:
3M product specification for 7900 Destructible White Vinyl Film Sheet.
3M product specification for 7930 Destructible Vinyl Label Material.
3M product specification for 7610 ScotchMark Destructible White Vinyl.
3M product specification for 7847 Laser Markable Tamper Evident Material.
3M product specification for 7385 ScotchMark Tamper-Indicating Dot-Matrix Impact Printable.
3M product specification for 7866 Tamper-Indicating Void Polyester.

We claim:

1. A tamper evident RFID tag, comprising:
a tamper evident label material, with
an adhesive on a back side,
an RFID Transponder adhered to said adhesive, and
a hologram on the label material
wherein the tamper evident label material is a vinyl with a tensile and tear resistance such that the tamper evident label material one of tears and breaks upon an attempted removal from a substrate.

2. The tag of claim 1 further including:
a release liner attached to said adhesive.

3. The tag of claim 1, further including:
a release liner attached to said adhesive.

4. The tag of claim 1, wherein:
the tamper evident label material is one of 3M 7866, 3M 7389 and 3M 7385.

5. The tag of claim 1, wherein:
the tamper evident label material is 3M 7610 ScotchMark Destructible Vinyl.

6. A tamper evident RFID tag, comprising:
a tamper evident label material, with
an adhesive on a back side, and
an RFID Transponder adhered to said adhesive, and microprinting on the label material
wherein the tamper evident label material is a vinyl with a tensile and tear resistance such that the tamper evident label material one of tears and breaks upon an attempted removal from a substrate.

7. The tag of claim 6 further including:
a release liner attached to said adhesive.

8. The tag of claim 6, further including:
a release liner attached to said adhesive.

9. The tag of claim 6, wherein:
the tamper evident label material is one of 3M 7866, 3M 7389 and 3M 7385.

10. The tag of claim 6, wherein:
the tamper evident label material is 3M 7610 ScotchMark destructible Vinyl.

11. A tamper evident RFID tag, comprising
a clear label material, with
a silicone pattern and a pigmented adhesive on a back side, and
an RE transponder adhered to said adhesive; and a hologram on the label material;
wherein separation of the tag from a substrate results in incomplete separation of the adhesive in the form of the silicone pattern and said pattern becomes visible.

12. The tag of claim 11 further including:
a release liner attached to said adhesive.

13. The tag of claim 11, further including:
a release liner attached to said adhesive.

14. The tag of claim 11, wherein:
the tamper evident label material is one of 3M 7866, 3M 7389 and 3M 7385.

15. The tag of claim 11, wherein:
the tamper evident label material is 3M 7610 ScotchMark destructible Vinyl.

* * * * *